(12) United States Patent
Ahmed (10) Patent No.: US 7,285,929 B2
(45) Date of Patent: Oct. 23, 2007

(54) BRUSHLESS MOTOR COMMUTATION AND CONTROL

(75) Inventor: Shehab Ahmed, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 217 days.

(21) Appl. No.: 11/216,509

(22) Filed: Aug. 31, 2005

(65) Prior Publication Data

US 2007/0046235 A1 Mar. 1, 2007

(51) Int. Cl.
*H02K 27/00* (2006.01)
(52) U.S. Cl. ............... 318/439; 318/254; 318/138; 310/68 R; 310/68 E; 310/68 B
(58) Field of Classification Search ........... 318/254, 318/138, 439; 310/68 E, 68 B, 68 R, 232, 310/233
See application file for complete search history.

(56) References Cited

U.S. PATENT DOCUMENTS

| | | | |
|---|---|---|---|
| 4,347,453 A | | 8/1982 | Gaus |
| 5,633,792 A | | 5/1997 | Massey |
| 5,962,946 A | * | 10/1999 | Kobman et al. ............ 310/233 |
| 6,239,531 B1 | * | 5/2001 | McGaughey ............... 310/233 |
| 6,667,564 B1 | | 12/2003 | Bui et al. .................. 310/233 |
| 6,753,634 B2 | * | 6/2004 | Rehder ..................... 310/232 |
| 7,239,098 B2 | | 7/2007 | Masino ..................... 318/254 |

FOREIGN PATENT DOCUMENTS

| | | |
|---|---|---|
| EP | 1113569 | 7/2001 |
| FR | 2527854 | 6/2001 |
| FR | 2801737 | 6/2001 |
| WO | 01/50578 | 7/2001 |

* cited by examiner

*Primary Examiner*—Rita Leykin
(74) *Attorney, Agent, or Firm*—Tim Curington; David Cate; Jamie Castano (57) ABSTRACT

A commutation apparatus drives a brushless motor having a stator equipped with a plurality of coils and a rotor. The commutation apparatus comprises a rotatable commutator shaft, two or more conducting rings carried discretely about the shaft, and two or more conducting segments carried discretely about the shaft at staggered positions along or near a plane perpendicularly intersecting the shaft. Each conducting segment is electrically connected to one of the conducting rings. Two or more electrical source contacts are provided for rotatably connecting a power supply across pairs of the conducting rings. A plurality of electrical load contacts is further provided for sequentially, rotatably connecting the conducting segments to discrete coils of the brushless motor. In particular embodiments of the commutation apparatus, a magnetic coupling is employed for rotatably coupling the commutator shaft to the rotor of the brushless motor, and a pressure-bearing container is provided for rotatably supporting the commutator shaft and the coupling therein.

24 Claims, 8 Drawing Sheets

BRUSHLESS MOTOR COMMUTATION AND CONTROL

BACKGROUND OF THE INVENTION

1. Field of the Invention

The present invention relates to apparatus and methods for brushless motor communication and control, and more particularly to such commutation and control in a downhole environment.

2. Background of the Related Art

Electric motors are the main means by which electrical energy is changed into mechanical energy. In industrial applications, electric motors range in size and power rating. There are several different types of motors in industrial use today. However, they can be grouped into two main categories, namely, brush-type and brushless. Brushless motors are in general made of a stator with a stator winding, and a rotor. The rotor can be made of only laminations, as is the case with the switched reluctance and synchronous reluctance motors. It can be made of a shaft with magnets mounted in different configurations, as in brushless motors, or permanent magnet synchronous motors can be used. Or, in the general case, the rotor can be combination of all the above technologies.

One thing all these technologies have in common is the need for an input voltage with variable magnitude and frequency to control them. Typically, a three-phase inverter is used for this task, and electronic commutation of a DC voltage is used to provide the variable voltage and frequency. In an ideal case, the use of a brushed DC motor would have eliminated the need to use a three-phase inverter in any application, especially ones that already have a provision for a variable DC voltage. In speed control applications, the use of a brushed DC motor would also eliminate the need for complex position sensing. In other cases, one would only need a variable DC voltage to control the motor, which would cut down the amount of electronics, and thus increase the efficiency and reduce the cost.

However, in downhole applications, the use of brushed DC motors is simply not possible because of the difficulty in placing the motor in air and applying a rotating seal that can withstand full differential pressure and motor torque. It is possible to magnetically couple the shaft torque of a brushed DC motor, but this is generally very inefficient. Placing the motor in oil will also not be possible because of the brushes and the commutator segments on the rotor need to be in contact in order to conduct electric current. The presence of an oil film between these two contacts will prevent proper conduction of current, and thus inhibit torque production.

The use of brushless motors, however, has some limitations. Particular difficulties in applying brushless motors downhole relate to the conventional use of electronic motor drives for communication and control of such motors. One of the main contributors to the development cost of a tool can be the development of such a motor drive. This is especially true in downhole tool development where the harsh environmental conditions limit the application of commercially available electronics. Thus, it is desirable—for at least some applications—to reduce or eliminate the requirement for power conversion electronics in brushless motor communication and control.

U.S. Pat. No. 6,239,531 to McGaughey and U.S. Pat. No. 6,667,564 to Tanh M. Bui et al both present mechanical commutator solutions having application in brushless motors. The '564 patent relates to an integrated motor/commutator system that relies on a particular timing cam and conducting terminals. The '531 patent relates to another integrated motor/commutator system that is characterized by a flexible conductive ring. Patent Publication No. WO 01/50578A1 to Pengov also describes a mechanical commutator, but one that is limited to driving a switched reluctance motor.

A need therefore exists for a mechanical commutator system for a brushless motor that is adaptive to downhole applications. For example, a need exists for such a commutator system that permits the physical separation of the commutator from the driven motor, e.g., using magnetic couplings, so as to permit the commutator and motor to be operated in discrete chambers or conditions.

SUMMARY OF THE INVENTION

The above-described needs, problems, and deficiencies in the art, as well as others, are addressed by the present invention in its various aspects and embodiments. In one aspect, the present invention provides a commutation apparatus for a brushless motor having a stator equipped with a plurality of coils and a rotor equipped with a permanent magnet assembly. The commutation apparatus comprises a rotatable commutator shaft, two or more conducting rings carried discretely about the shaft, and two or more conducting segments carried discretely about the shaft at staggered positions along or near a plane perpendicularly intersecting the shaft. Each conducting segment is electrically connected to one of the conducting rings. Two or more electrical source contacts are provided for rotatably connecting a power supply across pairs of the conducting rings. A plurality of electrical load contacts is further provided for sequentially, rotatably connecting the conducting segments to discrete coils of the brushless motor. It will be appreciated that the inventive commutation apparatus may be employed to advantage with any brushless motor, such as induction type, synchronous reluctance type, etc.

In particular embodiments of the commutation apparatus, a coupling is employed for rotatably coupling the commutator shaft to the rotor of the brushless motor. The coupling may comprise a magnetic coupling element carried by the commutator shaft that complements a magnetic coupling element carried by the rotor of the brushless motor.

In particular embodiments of the commutation apparatus, a container is provided for rotatably supporting the commutator shaft and the coupling therein. The container may be adapted for withstanding downhole fluid pressure within a wellbore penetrating a subsurface stratum. Additionally, the container may provide a means for positioning the electrical source and load contacts. Thus, the electrical source contacts may be carried within the container about the commutator shaft for establishing continuous electrical connections with the respective conducting rings. Similarly, the electrical load contacts may be carried within the container about the commutator shaft for establishing staggered electrical connections with the respective conducting segments along or near the plane. Both the electrical source contacts and the electrical load contacts may comprise spring-loaded brushes.

The number of electrical contacts are not constrained by the number of poles of the brushless motor. In particular embodiments, the brushless motor may be a two-pole motor having a commutation apparatus with two conducting segments. It will be appreciated by those skilled in the art that other configurations may also be suitable for establishing the desired rotating electrical contacts, in accordance with the present invention. Thus, the inventive commutation apparatus may be equipped with varying numbers of conducting segments, depending on variables such as the available space in a tool or system. For example, although four conducting segments may be employed to advantage for a four-pole motor, a particular embodiment may employ twelve conducting segments for a four-pole motor due to nothing more than size constraints.

The commutation apparatus may comprise two conducting rings carried discretely about the commutator shaft, and two conducting segments carried discretely about the commutator shaft at staggered positions along or near a plane perpendicularly intersecting the commutator shaft. Each conducting segment is electrically connected to one of the conducting rings. Two electrical source contacts are employed for rotatably connecting a power supply across the conducting rings. Six electrical load contacts are employed for sequentially, rotatably connecting the two conducting segments to two discrete coils of the brushless motor.

By way of further example, in other embodiments, the commutation apparatus may employ five conducting rings carried discretely about the commutator shaft, and four sets of four conducting segments carried discretely about the commutator shaft at staggered positions along or near four respective planes perpendicularly intersecting the commutator shaft. Each conducting segment is electrically connected to one of the conducting rings. Twelve electrical source contacts may be employed for rotatably connecting a power supply across pairs of the conducting rings, and twelve electrical load contacts may be employed for sequentially, rotatably connecting pairs of the conducting segments to two or more discrete coils of the brushless motor.

In another aspect, the present invention provides a commutated DC motor assembly, comprising a brushless motor having a stator equipped with a plurality of coils and a rotor equipped with a permanent magnet assembly. A commutator shaft is rotatably carried in axial alignment with the rotor. Two or more conducting rings are carried discretely about the commutator shaft, and two or more conducting segments are carried discretely about the commutator shaft at staggered positions along or near a plane perpendicularly intersecting the shaft. Each conducting segment is electrically connected to one of the conducting rings. Two or more electrical source contacts are employed for rotatably connecting a power supply across pairs of the conducting rings. A plurality of electrical load contacts are employed for sequentially, rotatably connecting the conducting segments to discrete coils of the brushless motor. An assembly is further employed for rotatably coupling the rotor of the brushless motor to the commutator shaft. The coupling assembly may comprise complementing magnetic coupling elements carried respectively by the commutator shaft and the rotor of the brushless motor.

Particular embodiments of the commutated DC motor assembly further comprise a container for rotatably supporting the commutator shaft and the coupling therein. The container may be adapted for withstanding downhole fluid pressure within a wellbore penetrating a subsurface stratum. The electrical source contacts may comprise spring-loaded brushes carried within the container about the commutator shaft for establishing continuous electrical connections with the respective conducting rings. Similarly, the electrical load contacts may comprise spring-loaded brushes carried within the container about the commutator shaft for establishing staggered electrical connections with the respective conducting segments along or near the plane.

In a further aspect, the present invention provides a method for commutating a brushless motor having a stator equipped with a plurality of coils and a rotor equipped with a permanent magnet assembly. The method comprises the steps of applying a current source across two or more discretely-carried conducting rings of a rotatable commutator shaft, with the conducting rings having two or more conducting segments electrically connected thereto. The commutator shaft is rotatably coupled to the rotor of the brushless motor. The conducting segments are sequentially connected to discrete coils of the brushless motor using rotation of the commutator shaft so as to sequentially energize the coils of the stator. The commutator shaft may be rotatably coupled to the rotor of the brushless motor using complementing magnetic coupling elements. The conducting segments may be sequentially connected to discrete coils of the brushless motor by rotatably supporting the commutator shaft within a container having a peripheral arrangement of electrical load contacts that are electrically connected to the coils of the stator.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
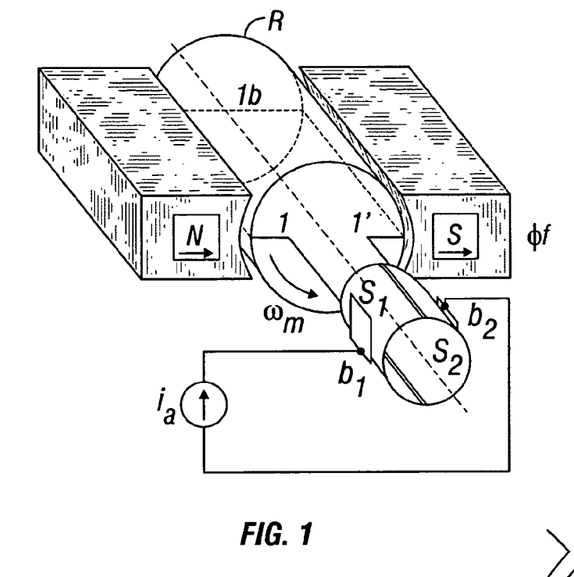
FIG. 1 is a schematic representation of a conventional brushed DC motor.

In order to appreciate the invention at hand, it is useful to summarize the theory of operation of brushed DC motors. FIG. 1 shows a simplified drawing illustrating the operating principles of a brushed DC motor and the main functions of its components. This simplified drawing shows two stationary electrical contacts, such as brushes $b_1$ and $b_2$, connected to a current source supplying current $i_a$. The brushes $b_1$, $b_2$ are placed against respective semi-cylindrical commutator segments $s_1$ and $s_2$. FIG. 1 also depicts a coil winding ("coil"), labeled as $1$-$1b$-$1'$, connected to the segments $s_1$ and $s_2$ and placed in a magnetic field $\varnothing_f$ created by the permanent magnets labeled simply as N, S.

Figure 2A:
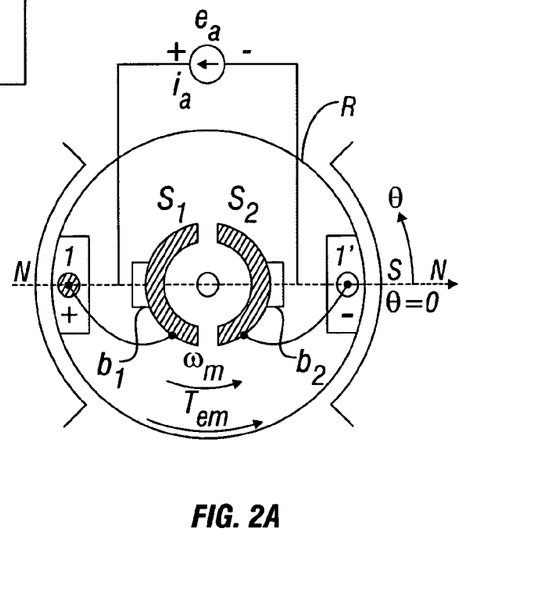
FIGS. 2A-2B schematically illustrate the operating principle of the brushed DC motor of FIG. 1.

FIGS. 2A-2B show the motor of FIG. 1 in sequential end views to clarify the motor's operation. In the illustrated position of FIG. 2A, current will pass from the current source $i_a$ into brush $b_1$ and segment $s_1$ into side 1 of the coil and then back through side 1' and segment $s_2$ and brush $b_2$. Due to the current passing in a conductor (i.e., the coil) placed in a magnetic field (the field $\varnothing_f$), a force will develop on the coil. Each side of the coil, 1 and 1', will then have a force developed that is opposing the force of the other side in direction. The presence of the two opposing forces will then produce a torque $T_{em}$, which will in turn cause the rotor R to rotate as indicated by $\omega_m$.

Figure 2B:
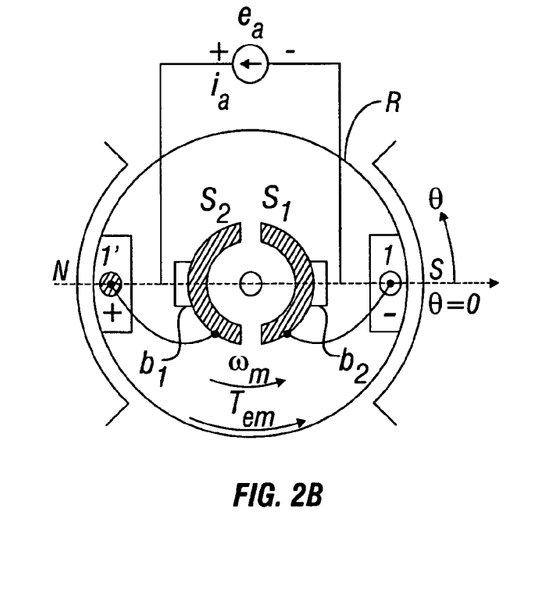

FIG. 2B illustrates the rotation of the rotor R to a new state, resulting from the positive current flowing in side 1 on the left (as seen in FIG. 2A) and the corresponding torque applied to the rotor. Thus, side 1' (on the right in FIG. 2A) is now on the left in FIG. 2B and is carrying the positive current. Thus, the brushes $b_1$ and $b_2$ act as a means to flip the current in the proper winding (i.e., coil sides 1, 1').

Figure 3A:
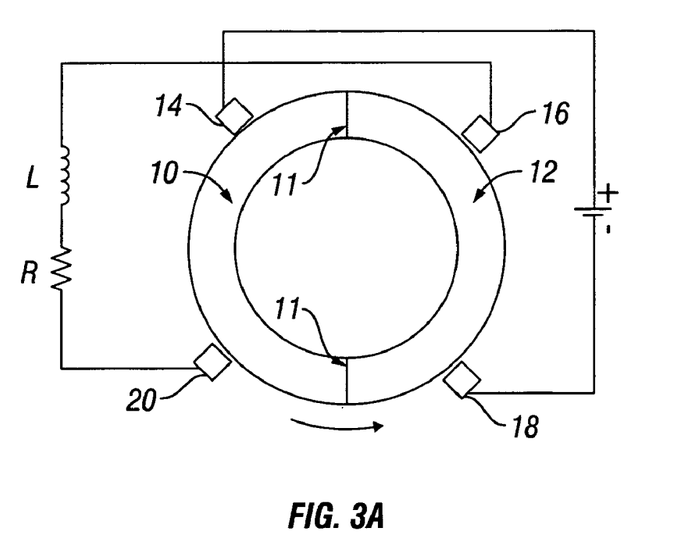
FIGS. 3A-3B schematically illustrate the production of alternating current in a simple circuit.
Figure 3B:
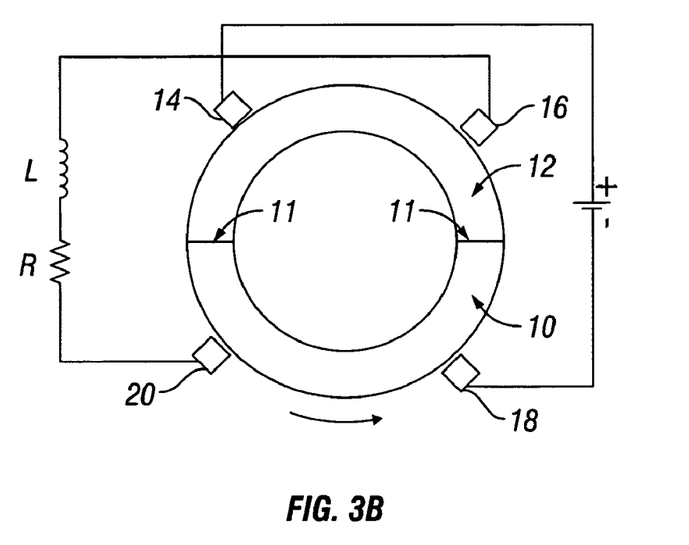
Figure 3C:
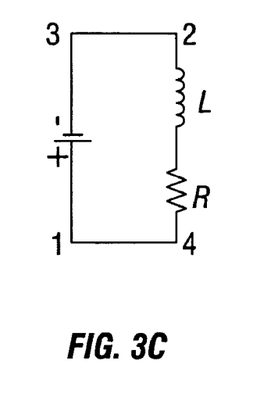
FIGS. 3C-3D illustrate equivalent circuit diagrams for respective FIGS. 3A-3B.
Figure 3D:
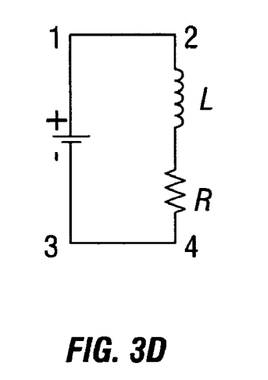
Figure 4A:
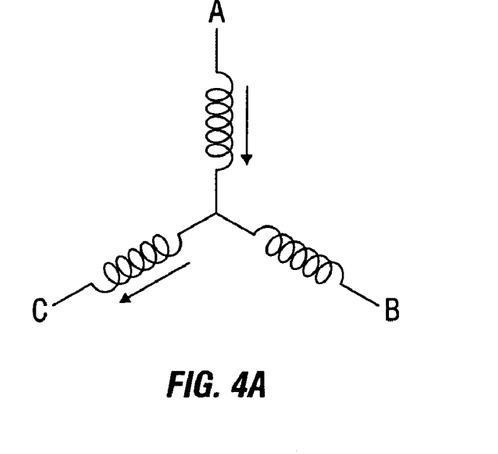
FIGS. 4A-4F are sequential current flow diagrams through the coil windings ("coils") of a stator of a brushless motor.
Figure 4B:
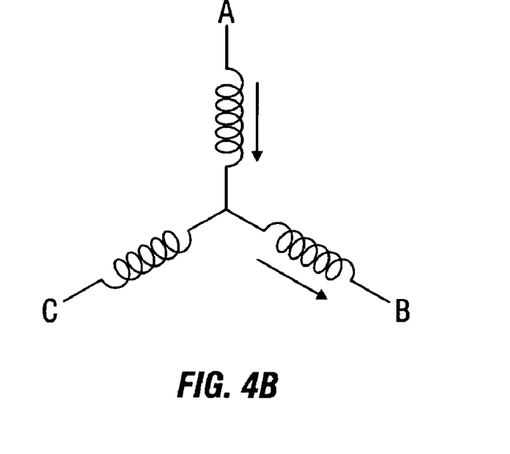
Figure 4C:
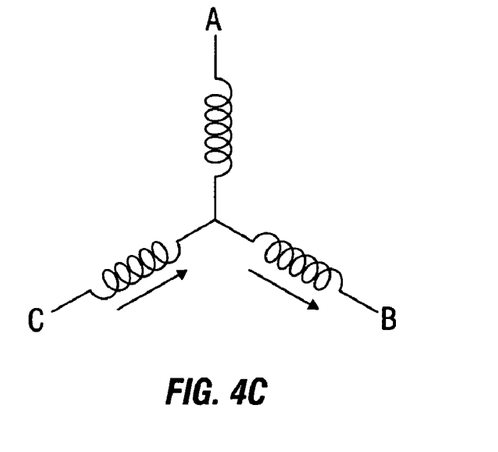
Figure 4D:
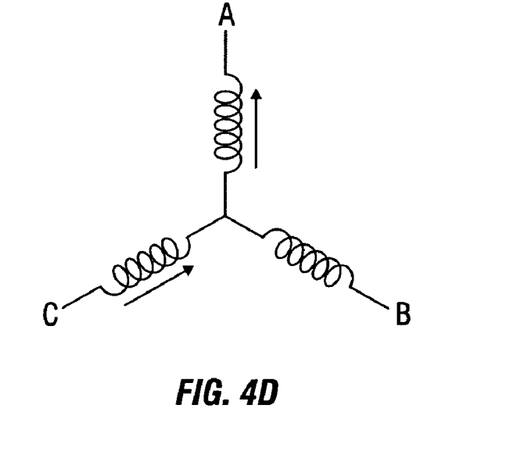
Figure 4E:
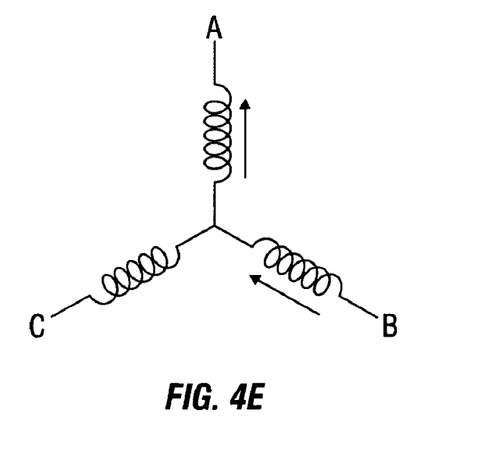
Figure 4F:
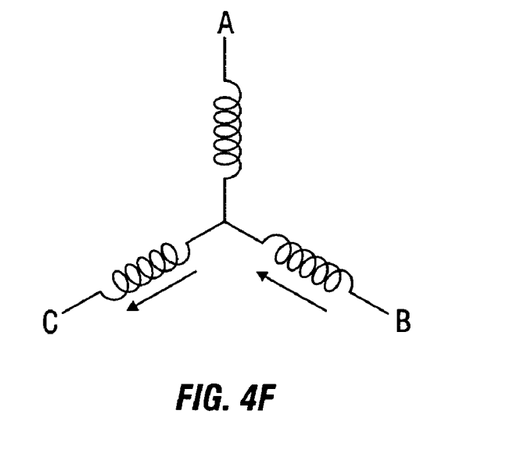

FIGS. 3A-3B show an example of the application of brushes to produce an alternating current in a simple R-L load. These figures complement the above summary of the operation of a brushless motor to complete the reader's understanding of the invention at hand. FIG. 3A shows two semicircular segments 10, 12 having small insulating layers 11 between them. The top (outer surface) of each of the segments 10, 12 is conducting. Stationary brushes 14, 16, 18, 20 are placed in a particular pattern around the segments. The equivalent circuit of the system of FIG. 3A is shown in FIG. 3C, where an R-L load and power source are connected in a certain configuration due to the brushes and their contact with the segment conducting surfaces. If the semicircular segments 10, 12 are rotated 90° as shown in FIG. 3B, another equivalent circuit will be created (see FIG. 3D). The geometry of the brushes, combined with the rotation of the segments, therefore acts as a switching means for the circuit. The means of rotation of the segments in this case is not significant to the explanation. Because this is a simple R-L load, the rotation will need to be applied using an external means.

FIGS. 4A-4F present the current flow diagrams required for continuous torque production in a conventional brushless DC motor, represented by stator coil windings ("coils") A, B, C. It can be seen that at each moment in time the current will be flowing between two terminals or in two phases (coils), followed by a sequence of current switching events so as to energize different pairs of terminals/phases. Thus, the switching sequence from FIG. 4A to FIG. 4F progresses so as to energize stator coil pairs as follows: AC, AB, CB, CA, BA, BC. If current were to flow sequentially in these patterns, torque would be continuously produced in the motor and continuous rotation of the motor's rotor would occur.

Figure 5:
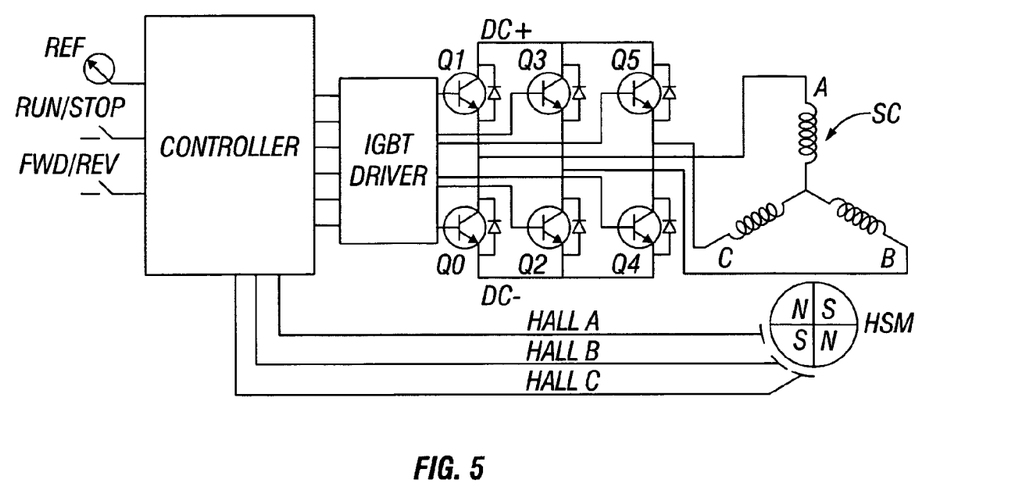
FIG. 5 is a schematic representation of a conventional electronic commutation apparatus using an inverter.

This selective current flow switching is conventionally accomplished using an electronic inverter as shown schematically in FIG. 5, where Hall sensors Hall A, Hall B, Hall C are employed to indicate the beginning and end of each of the six current flow paths shown in FIGS. 4A-4F. A controller sends the proper signals to an IGBT driver to connect the appropriate stator phases A, B, C to the DC rail, thus forcing current into the desired phases.

Figure 6:
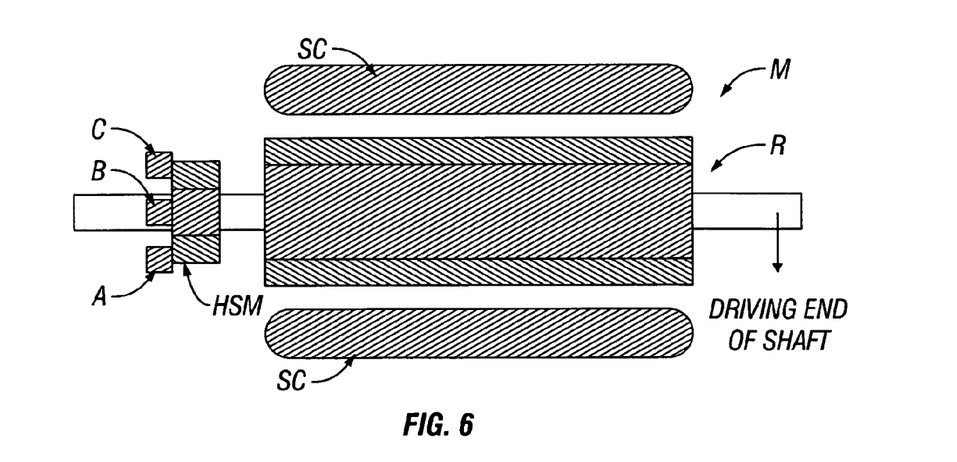
FIG. 6 is a schematic representation of a conventional brushless motor employing Hall sensors to complement an electronic commutation apparatus like that shown in FIG. 5.

FIG. 6 is a schematic representation of a conventional brushless motor M having three stator coils SC distributed about a rotatable rotor R. The rotor drives Hall sensor magnets HSM into/through the positions of which are sensed by the Hall sensors (A, B, C) of an electronic commutation like that shown in FIG. 5.

The present invention aims to eliminate the need for such electronic three-phase inversion. This is possible in applications requiring a constant speed, or where speed can be varied by merely changing the input DC voltage.

Figure 7:
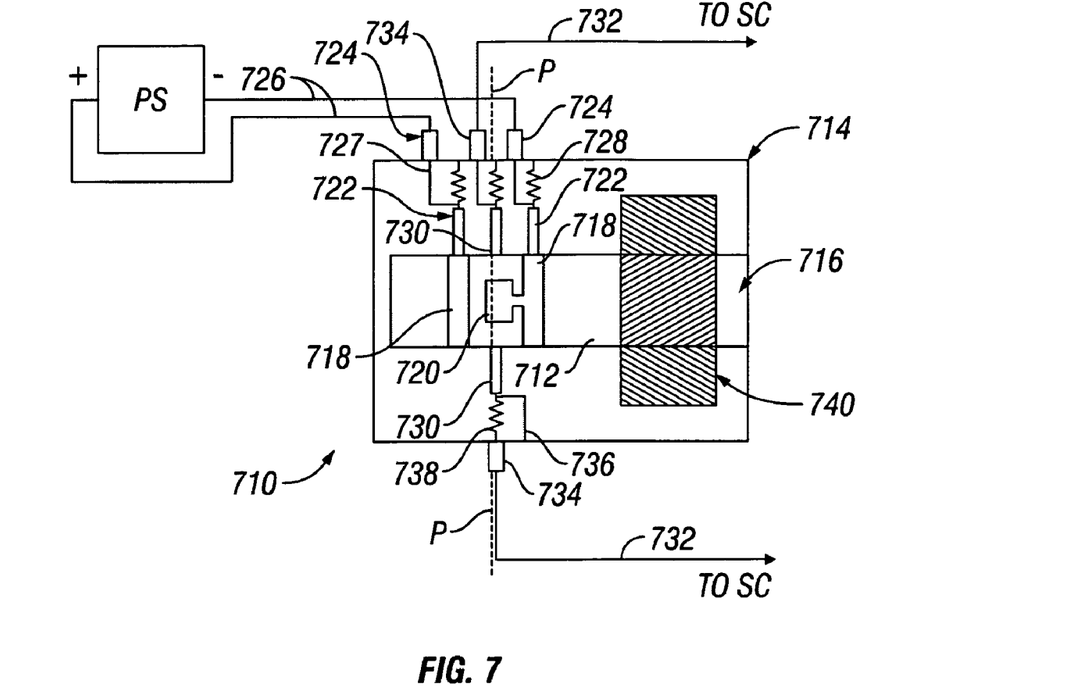
FIG. 7 is a schematic representation of one embodiment of a mechanical commutator employing a commutator shaft according to the present invention.

FIG. 7 is a schematic representation of one embodiment of a mechanical commutator 710, also known as a commutation apparatus, according to the present invention. The commutation apparatus 710 comprises a commutator shaft 712 carried for rotation within a housing or container 714 adapted to withstand the pressures and temperatures of downhole applications. Such a container can be charged with air (as opposed to oil, for example) as part of a downhole tool that utilizes a brushless motor. The shaft 712 is supported by a bearing assembly, referenced as 716, which includes radial and/or thrust bearings as are generally known in the art.

A coupling element, in particular an element 740 of a magnetic coupling assembly, is carried by the commutator shaft 712 for rotatably coupling the commutator shaft to the rotor of a driven brushless motor (not shown in FIG. 7). Thus, the magnetic coupling element 740 may be used to complement a corresponding magnetic coupling element carried by the rotor of the brushless motor, in a manner that is described below. It will be appreciated the element 740 may be similar or identical to that previously used for Hall sensing (see Hall sensor magnet HSM in FIG. 6).

Figure 8:
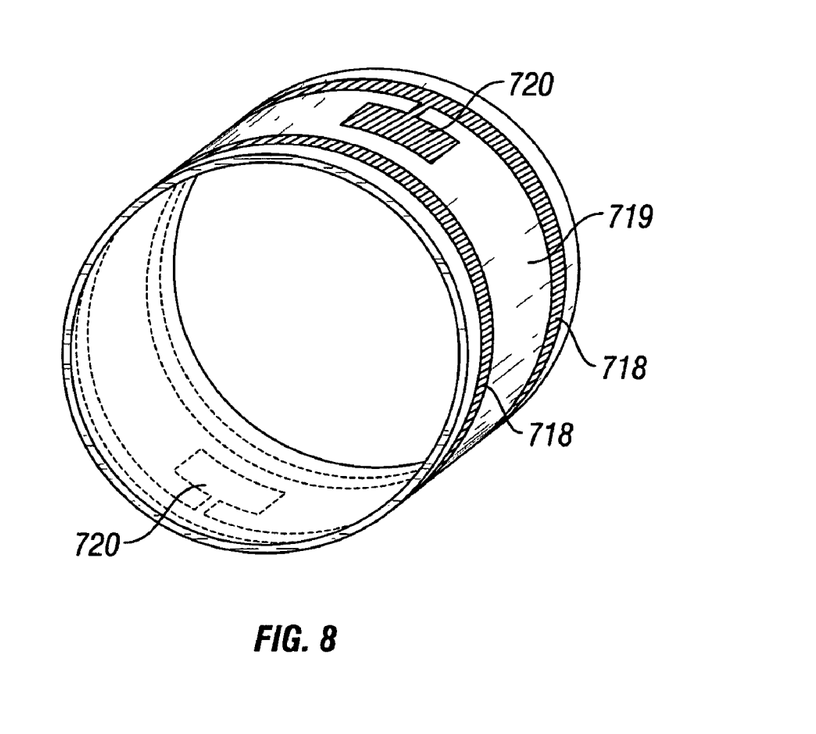
FIG. 8 is a detailed perspective view of the conducting ring and conducting segments of the commutator shown in FIG. 7.

With reference now to FIGS. 7 and 8, two or more conducting strips or rings 718 are carried discretely about the shaft 712, such that there is no electrical contact between the conducting rings 718. Thus, an insulating material (see material section 719 in FIG. 8) may be disposed between the rings 718 or the outer surface of the shaft 712 may be nonconductive, as is known in the art. It will be appreciated that the conducting rings may be implemented in varying numbers and with various conducting patterns (other strip configurations are described below) to provide for mechanical commutation of a brushless motor according to the present invention.

Two conducting segments 720 are carried discretely about the shaft 712 at staggered positions 180° apart along or near a plane (see plane P in FIG. 7) perpendicularly intersecting the shaft 712. Each conducting segment 720 is electrically connected to one of the conducting rings 718.

Two or more electrical source contacts, in particular brushes 722, are provided for rotatably connecting a power supply PS (e.g., a battery bank or other source) across the pair of conducting rings 720. Leads 726 extend from the power supply to pick-ups 724 carried on the outer surface of the container 714. Leads 727 extend from the pickups 724 to the brushes 722, which are spring loaded by springs 728 to ensure contact between the brushes 722 and the conducting rings 718.

Figure 10:
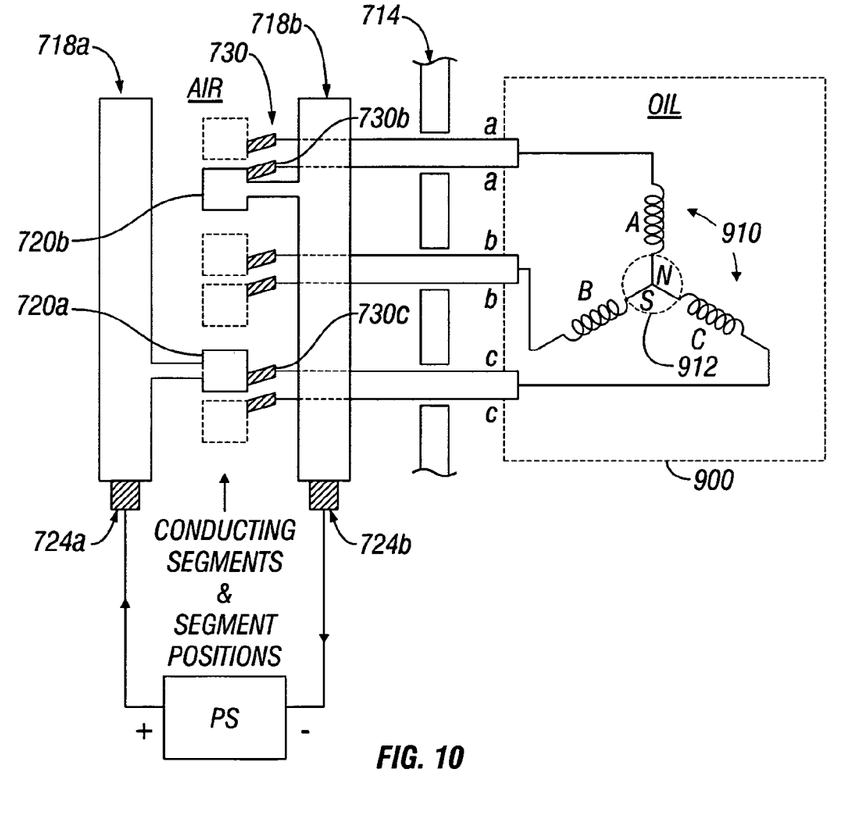
FIG. 10 is a wiring diagram of the commutator-motor assembly of FIG. 9, with the conducting rings and conducting segments shown "unrolled" from the commutator shaft.

With reference now to FIGS. 7 and 10, a plurality of electrical load contacts, in particular six brushes 730 (only two being shown in FIG. 7), is further provided for sequentially, rotatably connecting the conducting segments 720 to discrete stator coils SC (individually referenced as A, B, C in FIG. 10) of a driven brushless motor 900. Leads 732 extend from pick-ups 734 carried on the outer surface of the container 714 to the stator coils SC. Leads 736 extend from the pickups 734 to the brushes 730, which are spring loaded by springs 738 to ensure contact between the brushes 730 and the conducting segments 720. In this manner, each of the conducting segments 720 is connected to a corresponding terminal (+ or −) of the power supply PS through the container 714 and the system of leads, pick-ups, and brushes. The container 714 provides a means for positioning the electrical source and load brushes 722, 730. Thus, with particular reference to FIG. 10 (described further below), at any instant in time two of the load brushes 730 are connected to the two conducting segments 720, thereby selectively connecting the power supply terminals to particular stator coils SC of the driven brushless motor.

Figure 9:
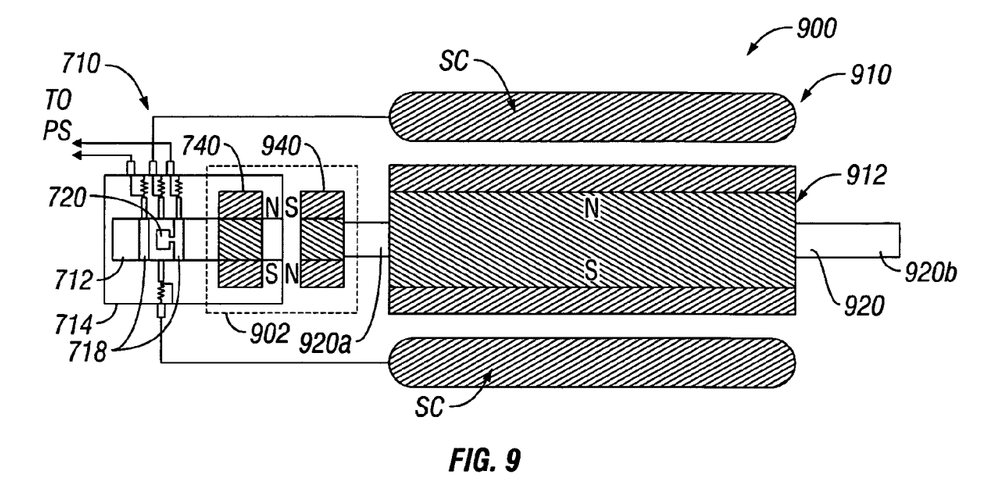
FIG. 9 is a schematic representation of an assembly wherein the commutator of FIG. 7 is rotatably coupled to a brushless motor using a magnetic coupling.

FIG. 9 is a schematic representation of an assembly wherein the commutator 710 of FIG. 7 is rotatably coupled to a brushless motor 900 using a magnetic coupling assembly 902. In one embodiment, the commutator 710 employs a rotating ring/segment and brush assembly that is isolated in air within the container 714, as described above. The brushless motor 900 has a stator 910 equipped with a plurality of coils SC and a rotor 912 equipped with a permanent magnet assembly (indicated by poles N, S). The commutator shaft 712 is rotatably carried by the container 714 in axial alignment with the rotor 912 and a shaft 920 connected to the rotor. The magnetic coupling assembly 902 rotatably couples the rotor shaft 920 of the brushless motor to the commutator shaft 712. The coupling assembly 902 may comprise complementing magnetic coupling elements 740, 940 (see opposing poles N, S) carried respectively by the commutator shaft 712 and the rotor shaft 920. It will be appreciated, however, that the brushes and rotating ring/segment assembly of the commutator 710 can otherwise be located in a common container with the motor 900, in which case the commutator shaft 712 could be mechanically coupled to the rotor shaft 920 without the need for a magnetic coupling.

FIG. 10, which was briefly described above, is a wiring diagram of the commutator-motor assembly of FIG. 9, with the conducting rings 718 and conducting segments 720 shown "unrolled" from the commutator shaft 712. In the position shown, the positive terminal of the power supply PS is connected to a particular conducting ring 718a via a particular pick-up 724a. The conducting segment 720a extending from the ring 718a is connected to a lead c-c due to the segment 720a being aligned with a load brush 730e at one of the ends of the lead c-c. Lead c-c is one of three leads (the others being leads a-a and b-b) that extend through a wall of the container 714 between the commutation apparatus 710 and the motor 900. The leads extend through the container wall in such a way (e.g., with potting) as to secure the pressure-bearing characteristics of the container 714, as is known in the art. Lead c-c is electrically connected to the stator coil C, which is also connected to coils A and B within the stator 910. Stator coil A is also connected to lead a-a which terminates in a brush 730b at one of its ends. The brush 730b is aligned with the conducting segment 720b, which is connected to the conducting strip 718b. Strip 718b is in turn connected to the negative terminal of the power supply PS by way of pickup 724b. In this manner, current from the power supply PS will flow through stator coils C and A, when the commutator segments 720 are positioned as shown in FIG. 10.

Such imbalanced current flow (coil B is not energized) produces torque between the energized coils C and A and the rotor 912, resulting in rotation of the rotor 912 and connected shaft 920. Shaft 920 has a first end 920a that is connected to the magnetic coupling element 940, which is positioned adjacent the commutator's magnetic coupling element 740. The torque applied to the rotor 912 thereby produces equivalent rotation of the motor shaft 920 and the commutator shaft 712. Very little power will be lost in the transfer of torque from the motor shaft 920 to the commutator shaft 712, as the lossy components are limited to the bearing losses, friction produced by brushes rubbing against the conducting segments, and the electrical losses in the brushes.

The coupling-induced rotation of the commutator shaft 712 causes the conducting segments 720a, 720b to engage another pair of load brushes 730, thereby energizing coils C and B and creating further torque and rotation of shafts 920, 712. This cycle of energizing stator coil pairs, creating torque, and rotating output shafts is repeated continuously while the commutator conducting rings 718 are connected across the power supply PS. The commutator 710 therefore electrically engages the stator 910 while it magnetically (or mechanically) engages the rotor 912 to fulfill the commutation function. Accordingly, the stator coils will be energized according to the following sequence: CA, CB, AB, AC, BC, BA (with the first coil being connected to the positive terminal and the second coil being connected to the negative terminal of the power supply PS).

Figure 11:
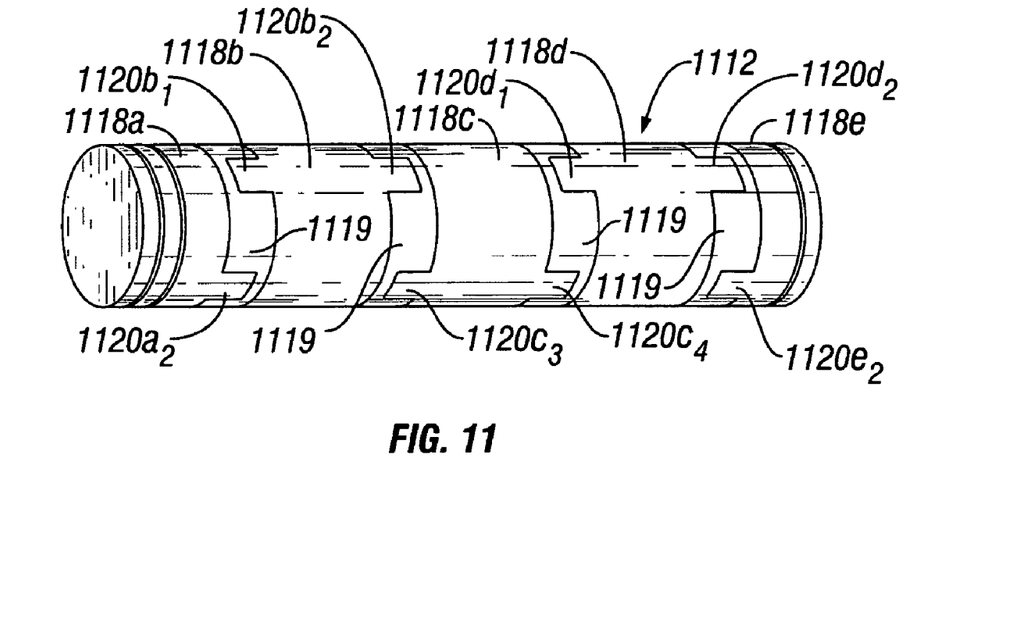
FIG. 11 is a perspective view of an alternative commutator shaft compared to the commutator shaft employed in FIGS. 7 and 9.
Figure 12:
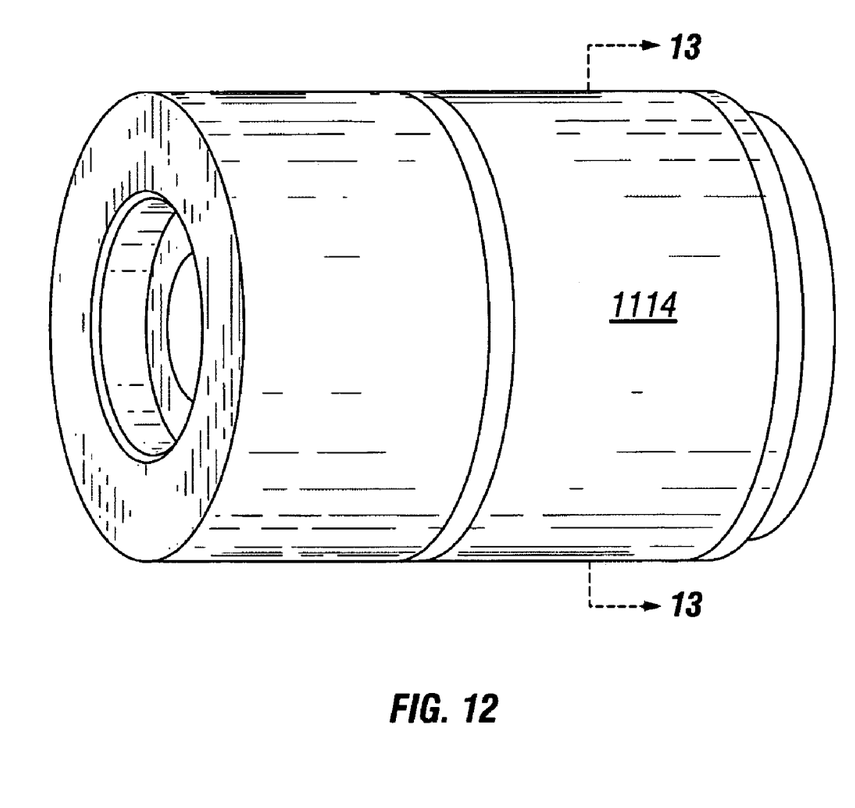
FIG. 12 is a perspective view of a commutator housing that complements the commutator shaft of FIG. 1.
Figure 13:
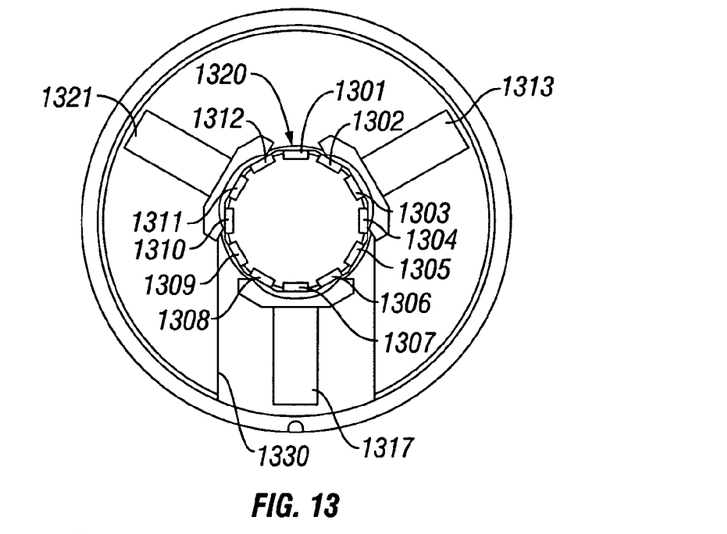
FIG. 13 is a cross-sectional view of the commutator housing, taken along section line 13-13 of FIG. 12.

FIG. 11 is a perspective view of an alternative commutator shaft 1112 compared to the commutator shaft employed in FIGS. 7 and 9. FIGS. 12-13 are perspective and cross-sectional views view of a cylindrical commutator housing 1114 that complements the commutator shaft 1112 of FIG. 11. The commutator shaft 1112 is carried for rotation within the container 1114, which is preferably adapted to withstand the pressures and temperatures of downhole applications. As in the case of container 714 described above, the container 1114 can be charged with air (as opposed to oil, for example) as part of a downhole tool that utilizes a brushless motor. The shaft 1112 may be supported by a bearing assembly (not shown) which includes radial and/or thrust bearings as are generally known in the art. The shaft may also be equipped with a magnetic coupling element (not shown) in similar fashion to the magnetic coupling element 740 described above.

The container 1114 is further equipped for supporting pluralities of power and load contacts, in particular brushes, about the shaft 1112 (when the shaft is positioned within the container). With reference now to FIG. 13, twelve brush carriers 1301-1312 are distributed about an inner cylindrical boundary 1320 of the container 1114 so as to place the carried brushes into physical contract with the commutator shaft 1112. The brush carriers 1301-1312 are distributed such that four sets of three brush carriers each at least partially align with four respective insulating rings 1119 (described below). The brush carriers 1303, 1307, 1311 are shown in FIG. 13 as being carried generally in a common plane by respective carrier arms 1313, 1317, 1321, although one arm 1317 and its brush carrier 1307 are slightly recessed with a channel 1330 for a reason that will be made clear in the description that follows.

Figure 14:
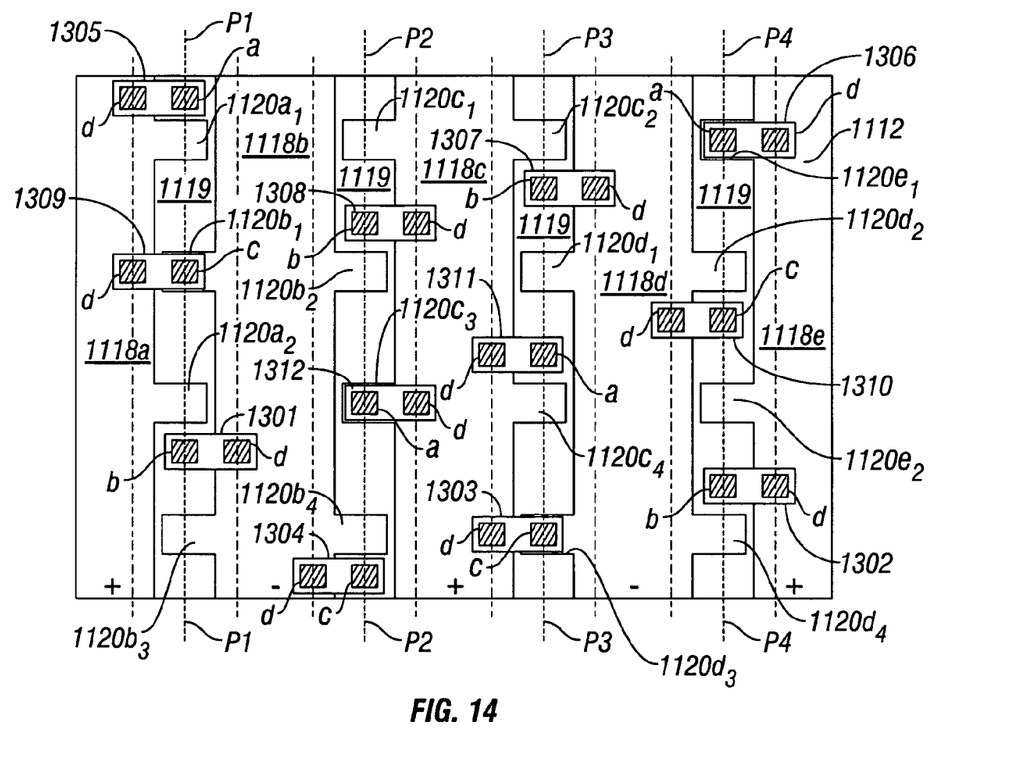
FIG. 14 is a schematic representation of the conducting rings and conducting segments of the commutator shaft of FIG. 11, shown "unrolled" from the shaft, along with the overlying positions of electrical source (power) brushes and electrical load (stator coil) brushes of the commutator housing of FIG. 12.

FIG. 14 is a schematic representation of the conducting rings and conducting segments of the commutator shaft of FIG. 11, shown "unrolled" from the shaft, along with the overlying positions of electrical source (power) brushes and electrical load (stator coil) brushes of the commutator housing of FIGS. 12-13. Five conducting strips or rings 1118$a$-$e$ are carried discretely about the shaft 1112. The conducting rings are separated by the insulating rings 1119 such that there is no electrical contact between the conducting rings. It will be appreciated that the conducting rings may be implemented in varying numbers and with various conducting patterns other than described herein to provide for mechanical commutation of a brushless motor.

Sixteen conducting segments 1120$a_{1-2}$, 1120$b_{1-4}$, 1120$c_{1-4}$, 1120$d_{1-4}$, and 1120$e_{1-2}$ are carried discretely about the shaft 1112 and arranged in staggered positions 90° apart along or near four respective planes (see planes P1-P4 in FIG. 14) perpendicularly intersecting the shaft 1112. Each conducting segment is electrically connected to one of the conducting rings.

Twelve electrical source contacts, in particular brushes, are provided for rotatably connecting a power supply (not shown) across pairs of the conducting rings. Twelve electrical load contacts, in particular brushes, are further provided for sequentially, rotatably connecting the conducting segments to discrete stator coils A, B, C of a driven brushless motor 900 (see FIG. 10). The electrical source brushes and load brushes are carried for convenience and efficiency within container 1114 in twelve discrete brush carriers 1301-1312, as mentioned above. Thus, e.g., as shown particularly in FIG. 14, one source brush 1305$d$ is carried with a load brush 1305$a$ in the brush carrier 1305, although the two brushes are electrically isolated from one another (no cross-conduction within the carrier).

The commutator-motor assembly of FIGS. 11-14 further employs leads, pick-ups, etc. in similar fashion to that described above in reference to the embodiment of FIGS. 7-10, so that each of the twelve load brushes is electrically connected to one of the three stator coils A, B, C of the motor 900 (see FIG. 10). At any instant in time, one of the conducting segments 1120$x$ of a conducting ring 1118$x$ is placed in contact with one of the load brushes, thereby selectively connecting the power supply terminals to two particular stator coils of the driven brushless motor 900.

More particularly, in the commutator position shown in FIG. 14, conducting rings 1118$a$, 1118$c$, and 1118$e$ are each connected to the positive terminal of a power supply (not shown), while conducting rings 1118$b$ and 1118$d$ are each connected to the negative terminal of the power supply. Neither of the conducting segments (1120$a_{1-2}$) connected to the conducting ring 1118$a$ is placed in contact with one of the load brushes, so ring 1118$a$ is not used at this instant to energize any of the stator coils. Conducting ring 1118$b$ has four conducting segments (1120$b_{1-4}$) connected thereto, and one of these segments, segment 1120$b_1$, is placed in contact with a load brush 1309$c$. Load brush 1309$c$ (along with the other "c" load brushes) is connected to the stator coil C of the motor 900, thereby placing the negative terminal of the power supply in electrical connection with stator coil C. Conducting ring 1118$c$ has four conducting segments (1120$c_{1-4}$) connected thereto, and one of these segments, segment 1120$c_3$, is placed in contact with a load brush 1312$a$. Load brush 1312$a$ (along with the other "a" load brushes) is connected to the stator coil A of the motor 900, thereby placing the positive terminal of the power supply in electrical connection with stator coil A. Accordingly, stator coils C and A are energized, resulting in the application of torque to the rotor 912 and the commutator shaft 1112 via a magnetic coupling assembly (not shown), in similar fashion to that described above.

Conducting ring 1118$d$ has four conducting segments (1120$d_{1-4}$) connected thereto, and one of these segments, segment 1120$d_3$, is placed in contact with a load brush 1303$c$. Load brush 1303$c$ (like the other "c" load brushes) is connected to the stator coil C of the motor 900, thereby (also) placing the negative terminal of the power supply in electrical connection with stator coil C. Conducting ring 1118$e$ has two conducting segments (1120$e_{1-2}$) connected thereto, and one of these segments, segment 1120$e_1$, is placed in contact with a load brush 1306$a$. Load brush 1306$a$ (like the other "a" load brushes) is connected to the stator coil A of the motor 900, thereby (also) placing the positive terminal of the power supply in electrical connection with stator coil A. Accordingly, stator coils C and A are further energized, primarily for redundancy.

It will be appreciated by those having ordinary skill in the art that at any instant four of the five conducting rings 1118$a$-$e$ will each be placed in contact with one or more of the source brushes so as to connect two of the rings to the positive terminal of the power supply and two of the rings to the negative terminal of the power supply. The conducting segments attached to the four energized conducting rings will be placed in contact with the load brushes corresponding (redundantly) to two of the three stator coils of the motor 900. The coils will be energized according to the following sequence: AC (described above), BC, BA, CA, CB, AB (with the first coil being connected to the positive terminal and the second coil being connected to the negative terminal of the power supply PS).

The number of electrical contacts is not constrained by the number of poles of the brushless motor. One embodiment comprises a two-pole brushless motor (like motor 900) having a commutation apparatus with two conducting segments. However, the inventive commutation apparatus may be equipped with varying numbers of conducting segments, depending on variables such as the available space in a tool or system. For example, although four conducting segments may be employed to advantage for a four-pole motor, a particular embodiment may employ twelve conducting segments for a four-pole motor due to nothing more than size constraints. Other suitably-driven motor configurations will be apparent to those having ordinary skill in the art. Also, pluralities of commutators may be operatively connected to drive a single motor.

It will be further appreciated that the commutator and commutator-motor assembly described herein has utility in numerous downhole applications, including high temperature and pressure conditions, that require brushless motors.

It will be understood from the foregoing description that various other modifications and changes may be made in the preferred and alternative embodiments of the present invention without departing from its true spirit. Thus, e.g., while electrical brushes are described herein for use as electrical source and load contacts, the present invention is not so limited. Other electrical contact solutions may be apparent to those skilled in the art.

This description is intended for purposes of illustration only and should not be construed in a limiting sense. The scope of this invention should be determined only by the language of the claims that follow. The term "comprising" within the claims is intended to mean "including at least"

such that the recited listing of elements in a claim are an open set or group. Similarly, the terms "containing," having," and "including" are all intended to mean an open set or group of elements. "A," "an" and other singular terms are intended to include the plural forms thereof unless specifically excluded.

What is claimed is:

1. A commutation apparatus for a brushless motor having a stator equipped with a plurality of coils and a rotor equipped with a permanent magnet assembly, the commutation apparatus comprising:
a rotatable commutator shaft;
two or more conducting rings carried discretely about the shaft;
two or more conducting segments carried discretely about the shaft at staggered positions along or near a plane perpendicularly intersecting the shaft, each conducting segment being electrically connected to one of the conducting rings;
two or more electrical source contacts for rotatably connecting a power supply across pairs of the conducting rings; and
a plurality of electrical load contacts for sequentially, rotatably connecting the conducting segments to discrete coils of the brushless motor.

2. The commutation apparatus of claim 1, further comprising a coupling at least partially carried by the commutator shaft for rotatably coupling the commutator shaft to the rotor of the brushless motor.

3. The commutation apparatus of claim 2, wherein the coupling comprises a magnetic coupling element carried by the commutator shaft that complements a magnetic coupling element carried by the rotor of the brushless motor.

4. The commutation apparatus of claim 2, further comprising a container for rotatably supporting the commutator shaft and the coupling therein.

5. The commutation apparatus of claim 4, wherein the container is adapted for withstanding downhole fluid pressure within a wellbore penetrating a subsurface stratum.

6. The commutation apparatus of claim 4, wherein the electrical source contacts comprise spring-loaded brushes carried within the container about the commutator shaft for establishing continuous electrical connections with the respective conducting rings.

7. The commutation apparatus of claim 4, wherein the electrical load contacts comprise spring-loaded brushes carried within the container about the commutator shaft for establishing staggered electrical connections with the respective conducting segments along or near the plane.

8. The commutation apparatus of claim 1, wherein the brushless motor is a two-pole motor.

9. The commutation apparatus of claim 8, comprising:
two conducting rings carried discretely about the commutator shaft;
two conducting segments carried discretely about the commutator shaft at staggered positions along or near a plane perpendicularly intersecting the commutator shaft, each conducting segment being electrically connected to one of the conducting rings;
two electrical source contacts for rotatably connecting a power supply across the conducting rings; and
six electrical load contacts for sequentially, rotatably connecting the two conducting segments to two discrete coils of the brushless motor.

10. The commutation apparatus of claim 1, wherein the brushless motor is a four-pole motor.

11. The commutation apparatus of claim 1, comprising:
five conducting rings carried discretely about the commutator shaft;
four sets of four conducting segments carried discretely about the commutator shaft at staggered positions along or near four respective planes perpendicularly intersecting the commutator shaft, each conducting segment being electrically connected to one of the conducting rings;
twelve electrical source contacts for rotatably connecting a power supply across pairs of the conducting rings; and
twelve electrical load contacts for sequentially, rotatably connecting pairs of the conducting segments to two or more discrete coils of the brushless motor.

12. A commutated DC motor assembly, comprising:
a brushless motor having a stator equipped with a plurality of coils and a rotor equipped with a permanent magnet assembly;
a commutator shaft rotatably carried in axial alignment with the rotor;
two or more conducting rings carried discretely about the commutator shaft;
two or more conducting segments carried discretely about the commutator shaft at staggered positions along or near a plane perpendicularly intersecting the shaft, each conducting segment being electrically connected to one of the conducting rings;
two or more electrical source contacts for rotatably connecting a power supply across pairs of the conducting rings;
a plurality of electrical load contacts for sequentially, rotatably connecting the conducting segments to discrete coils of the brushless motor; and
an assembly for rotatably coupling the rotor of the brushless motor to the commutator shaft.

13. The assembly of claim 12, wherein the coupling assembly comprises complementing magnetic coupling elements carried respectively by the commutator shaft and the rotor of the brushless motor.

14. The assembly of claim 12, further comprising a container for rotatably supporting the commutator shaft and the coupling therein.

15. The assembly of claim 14, wherein the container is adapted for withstanding downhole fluid pressure within a wellbore penetrating a subsurface stratum.

16. The assembly of claim 14, wherein the electrical source contacts comprise spring-loaded brushes carried within the container about the commutator shaft for establishing continuous electrical connections with the respective conducting rings.

17. The assembly of claim 14, wherein the electrical load contacts comprise spring-loaded brushes carried within the container about the commutator shaft for establishing staggered electrical connections with the respective conducting segments along or near the plane.

18. The assembly of claim 12, wherein the brushless motor is a two-pole motor.

19. The assembly of claim 18, comprising:
two conducting rings carried discretely about the commutator shaft;
two conducting segments carried discretely about the commutator shaft at staggered positions along or near a plane perpendicularly intersecting the shaft, each conducting segment being electrically connected to one of the conducting rings;

two electrical source contacts for rotatably connecting a power supply across the conducting rings; and six electrical load contacts for sequentially, rotatably connecting the two conducting segments to two discrete coils of the brushless motor.

20. The assembly of claim 12, wherein the brushless motor is a four-pole motor.

21. The assembly of claim 12, comprising:

five conducting rings carried discretely about the commutator shaft;

four sets of four conducting segments carried discretely about the commutator shaft at staggered positions along or near four respective planes perpendicularly intersecting the commutator shaft, each conducting segment being electrically connected to one of the conducting rings;

twelve electrical source contacts for rotatably connecting a power supply across pairs of the conducting rings; and twelve electrical load contacts for sequentially, rotatably connecting pairs of the conducting segments to two or more discrete coils of the brushless motor.

22. A method for commutating a brushless motor having a stator equipped with a plurality of coils and a rotor, the method comprising the steps of:

applying a current source across two or more discretely-carried conducting rings of a rotatable commutator shaft, the conducting rings having two or more conducting segments electrically connected thereto;

rotatably coupling the commutator shaft to the rotor of the brushless motor; and sequentially connecting the conducting segments to discrete coils of the brushless motor using rotation of the commutator shaft so as to sequentially energize the coils of the stator.

23. The method of claim 22, wherein the commutator shaft is rotatably coupled to the rotor of the brushless motor using complementing magnetic coupling elements.

24. The method of claim 22, wherein the conducting segments are sequentially connected to discrete coils of the brushless motor by rotatably supporting the commutator shaft within a container having an arrangement of electrical load contacts that are electrically connected to the coils of the stator.

* * * * *